Patented Mar. 20, 1928.

1,663,435

UNITED STATES PATENT OFFICE.

DONALD B. BRADNER, OF EDGE MOOR, DELAWARE, ASSIGNOR TO E. I. DU PONT DE NEMOURS & COMPANY, OF WILMINGTON, DELAWARE, A CORPORATION OF DELAWARE.

METHOD OF PRODUCING BASIC ALUMINUM SULPHATE AND THE PRODUCT THEREOF.

No Drawing.    Application filed March 19, 1925. Serial No. 16,839.

This invention relates to the manufacture of basic aluminum sulphate, popularly called "basic alum", that is, aluminum sulphate which contains materially less sulphuric acid than that required by the formula $Al_2(SO_4)_3$ or, stated somewhat differently, aluminum sulphate which contains alumina, $Al_2O_3$, in excess of that required by the formula $Al_2(SO_4)_3$, that is, $$Al_2O_3(SO_3)_3.$$

For ease of description I refer to the alumina in excess of that required by the formula as, basic or uncombined alumina, and use the terms "basicity", "percentage basicity", and the like as referring to that part of the total alumina present in the product, which is present as excess alumina. Thus, a product having a total alumina content of 11 parts in the hundred, of which 8.5 parts are required by the formula $Al_2O_3(SO_3)_3$ and of which 2.5 parts are in excess, I refer to as having 11% total alumina and a basicity, or percentage basicity, of 22.7% 

For many years the desirability of a process whereby aluminum sulphate of high basicity could be produced commercially, that is, at reasonable cost and without serious complications, has been recognized; but, despite this, previous attempts to produce such a sulphate have been costly, complicated, wasteful and commercially impracticable. Among other requirements which, in previous procedures, render commercial production impracticable is the necessity of using high temperatures and pressures if waste of raw materials is to be kept low. I have devised a procedure which is practicable commercially since it eliminates the use of high pressures and temperatures, and various prior difficulties, and yet is capable of producing aluminum sulphate of high basicity. It is a major object of the invention to provide such a process. It is a further object to provide a product having a high basicity, particularly as made by the present method. To these ends, and also to improve generally upon methods and products of the character indicated, the invention consists in the various matters hereinafter described and claimed.

In general, my invention comprises the digestion of the raw material which supplies the alumina, for example, bauxite or aluminum hydrate, with a solution of normal aluminum sulphate, and this without the necessity of using high temperatures, or pressures above atmospheric. A considerable excess of raw material is preferably used in the digestion, and the procedure provides for the extraction of alumina from the excess raw material and its ultimate incorporation in the product, whereby the great advantage of using an excess of raw material is utilized but yet there is practically no ultimate loss. This is preferably accomplished by treating the sludge from the digesting step with sulphuric acid, preferably in excess, and then, by a countercurrent process in which the sludge travels to "waste" and the aluminum sulphate travels to the digesting apparatus, using the sulphate to digest the incoming raw material. As a further, and highly important feature, of the procedure as preferably practiced, I treat the raw material, particularly when it contains iron, with a reducing agent, for example, hydrogen sulphide, this giving a much higher basicity than is otherwise commercially attainable. It will be noted that this feature is of particular significance when the raw material is bauxite.

With the process as above outlined, and to be more specifically described hereinafter, I am readily able to produce commercially from a raw material, even no better than bauxite, a basic sulphate which has a basicity of twenty to thirty percent. Also, I have found that the bauxite residue settles much more readily in the highly basic solutions produced than in solutions of the normal sulphate of the same alumina content. This ready settling makes easily possible the separation of the basic solution from the solid residue with much less dilution than would normally be required, and consequently permits the production, without evaporation, of a liquor of higher alumina content than can be produced in a case where normal sulphate is made.

In detail, the procedure may be substantially as follows, it being understood that the directions, in their details, are given by way of example merely, and not by way of restriction, as it will be evident that considerable departure from them can be made without departure from the invention:—

Bauxite, previously ground to pass a 200-mesh screen is fed to any suitable agitating device, for example, one comprising a tank and paddle stirrer, together with a water solution of normal aluminum sulphate, such solution containing desirably from 7 to 12 percent, preferably 9 percent, combined alumina, and about 3.0 pounds of aluminum sulphate per pound of bauxite (50% $Al_2O_3$) being used. In a practical continuous operation, and as hereafter indicated by the detailed illustration given, it is more convenient to feed, instead of a simple aluminum sulphate solution, a solution containing, besides sulphate, some free sulphuric acid, the amounts of sulphate and acid being such that the acid, when it enters the agitator and reacts with the bauxite present will, together with the sulphate present in the fed solution, give a solution of the combined alumina percentages mentioned. and somewhat less than 3.0 pounds of sulphate per pound of bauxite being fed. Also is fed approximately that quantity of a reducing agent, for example, metallic aluminum (dross), hydrogen sulphide, or sulphur dioxide, required to bring the iron (in the bauxite) into solution, the exact quantity desirable in any particular case being governed, of course, by the iron present. For practical purposes, I have found an amount of reducing agent sufficient to reduce all the iron present to ferrous condition amply sufficient. After thorough agitation. two agitators in series being desirably used. the slurry is run to any suitable thickening device of the type wherein the slurry is settled and the solution continuously withdrawn from the sludge (for example, a Dorr thickener). A treatment of about eight hours in the agitators, at a temperature from 90 to 105° C., I have found to give a generally satisfactory basicity, to-wit, about 25%. The solution, separated from the sludge in the thickener, is removed from the system, and treated in any way desired, for example, concentrated directly to produce basic aluminum sulphate. In this procedure approximately one-half of the soluble alumina is removed from the bauxite.

It is to be particularly noted that although a product having about 25% of its alumina uncombined is obtained, no expensive autoclaves, high pressures, or excessively high temperatures are required; nor is neutralization with calcium carbonate, with its attendant waste of sulphuric acid as calcium sulphate, called for. With regard to the reason for the efficacy of the reducing agent, the explanation that at present seems to me the probable one is that insoluble ferric iron compounds ($Fe_2O_3$) surrounding alumina particles in the bauxite greatly retard the taking up of the alumina; whereas, when the iron compounds are reduced to ferrous compounds, they become soluble and the difficulty is overcome, it being apparently the fact that ferric compounds ($Fe_2O_3$) do not dissolve into the aluminum sulphate solution, but ferrous compounds do. It will be understood, however, that I do not confine the invention to any particular theory: whatever the explanation, the fact is that the use of the reducing agent enables me to readily obtain aluminum sulphate of about 25% basicity while without the reducing agent, but with the procedure otherwise substantially as indicated, such a high basicity is obtained only with great difficulty, if at all.

Returning now to the carrying on of the operations, the sludge from the thickner is, upon its removal therefrom, run to any suitable agitator, or preferably two in series, and digested with sulphuric acid, preferably in excess, to dissolve substantially all the remaining alumina, and from the agitators the slurry is run to a series, desirably three, thickeners in countercurrent arrangement. In these, the sludge travels down the series and ultimately to "waste" from the final thickener, while water, in sufficient quantity to take up the aluminum sulphate and to give desired ultimate alumina concentration in the agitator to which the bauxite is originally supplied, is run into the final thickener and travels up the series, the solution from the first thickener of the series, that is, the first after the sulphuric acid agitators, being fed to the agitator into which the bauxite is being fed; all as will be understood by those familiar with countercurrent flow assemblies. With bauxite, sulphuric acid, and water continuously added, the process can be carried on continuously.

The particular amounts of acid and of water desirable will of course depend upon the composition of the bauxite and the extraction of alumina obtained in the initial treatment. It is generally desirable to use strong acid in order that substantially all the water supplied to the system may be added at the end of the washing system rather than intermediate its length. The temperature of the solution in the sulphuric acid agitators is desirably maintained at between 100° and 110° C.

As a practical operating detail I may say that in a complete system comprising in series two initial agitators, A and B in series and to the first of which the bauxite and sulphate solution are added, an initial thickener 1 from which the product is drawn off, two sulphuric acid agitators, C and D in series and in the first of which the acid is added to the sludge from thickener 1, and three thickeners 2, 3, 4, the conditions may be as follows:—Composition of solutions in the tanks—"B", $Al_2O_3$ 11%; "1", 11% $Al_2O_3$, and of this total alumina content, 23% uncombined and 77% combined; "D", 11.7%

$Al_2O_3$, 7.2% free $H_2SO_4$; "2", 7.53% $Al_2O_3$, 4.65% $H_2SO_4$; "3", 2.11% $Al_2O_3$, 1.3% $H_2SO_4$; "4", .49% $Al_2O_3$, .3% $H_2SO_4$. Pounds of solids (sd.) and solution (so.) per pound of bauxite added—into "1" from "B", 6.36 so., .62 sd.; from "1" out of system, 4.5 so.; from "1" into "C", 1.86 so., .62 sd.; from "D", into "2", 3.88 so., .3 sd.; from "2" into "3", from "3" into "4", from "4" to "waste", each, .9 so., .3 sd.; into "4" 3. water fed; from "4" into "3" and "3" into "2", each 3. so.; from "2" into "A", 5.98 so., (also fed, bauxite 1.); into "C", $H_2SO_4$ 1.13, $H_2O$ .57. With the bauxite treated containing about 3% $Fe_2O_3$ there is fed to agitator A, with the bauxite and the sulphate solution, about .007 pound of hydrogen sulphide per pound of bauxite.

While more particular reference has been made to bauxite it will be understood that other raw materials, for example, alumina dross and so forth, may be successfully used, the procedure providing that such materials can be readily attacked by aluminum sulphate solution. It will be noted that the procedure takes advantage of the facts that more alumina can be extracted by completing the reaction in acid solution, and that the sludge settles more rapidly in either acid or basic solutions than in solutions of the normal salts.

The basic liquor removed from the system, for example from thickener "1", may, as before indicated, be evaporated and allowed to form a solid product, or the basic aluminum sulphate may be separated from the normal sulphate by crystallization, or the basic liquor may be used direct in other operations such as water purification or paper manufacture. In case the normal aluminum sulphate is desired, it can be obtained by the addition of the required amount of sulphuric acid to the basic liquor.

In practicing the process, the temperature may be maintained in the system used in any desired manner, as by heating coils or the like, and I find it desirable to use hot water in supplying water to the system.

While the treatment of the aluminum-containing material with a solution of an aluminum sulphate that is formed by the treatment of excess raw material with sulphuric acid has been more particularly described, it will be understood that aluminum sulphate and the solution thereof, for treatment of the raw material, may be provided otherwise than as hereabove specifically indicated. The process finds particularly advantageous use with raw materials containing less than 5% of monovalent metal salts. It is to be understood that where, in the claims, I refer to a material containing aluminum I include materials containing aluminum compounds, and similarly with reference to iron.

I claim:

1. The process of making basic aluminum sulphate which comprises digesting a material containing aluminum with aluminum sulphate solution, containing from 7 to 12 percent combined alumina, at a temperature substantially between 90° and 105° C.

2. The process of making aluminum sulphate of high basicity from material containing aluminum and iron which comprises the step of digesting the material and treating the material with a reducing agent during digestion.

3. The process of making aluminum sulphate of high basicity from bauxite which comprises digesting the bauxite with aluminum sulphate solution, containing 7 to 12 percent combined alumina, at a temperature substantially between 90° and 105° C., and treating with a reducing agent during the digestion.

4. The process of making aluminum sulphate of high basicity from bauxite which comprises digesting the bauxite with aluminum sulphate solution, containing 7 to 12 percent combined alumina, at a temperature substantially between 90° and 105° C., and during the digestion treating with a reducing agent in substantially sufficient amount to reduce the ferric iron present to ferrous condition.

5. As a new product, basic aluminum sulphate solution having a total alumina content of about 11 parts in the hundred, of which about 8.5 parts are combined and about 2.5 parts uncombined.

In testimony whereof I affix my signature.

DONALD B. BRADNER.